US011443639B2

(12) United States Patent
Huang

(10) Patent No.: US 11,443,639 B2
(45) Date of Patent: Sep. 13, 2022

(54) METHODS OF GENERATING A UNMANNED AERIAL VEHICLE MIGRATION TRAJECTORY, ELECTRONIC DEVICES AND STORAGE MEDIUMS

(71) Applicant: MOUTONG SCIENCE AND TECHNOLOGY CO., LTD, Guangdong (CN)

(72) Inventor: Hui Huang, Guangdong (CN)

(73) Assignee: MOUTONG SCIENCE AND TECHNOLOGY CO., LTD, Guangdong (CN)

( * ) Notice: Subject to any disclaimer, the term of this patent is extended or adjusted under 35 U.S.C. 154(b) by 0 days.

(21) Appl. No.: 16/477,144

(22) PCT Filed: Oct. 12, 2018

(86) PCT No.: PCT/CN2018/109972
§ 371 (c)(1),
(2) Date: Jul. 10, 2019

(87) PCT Pub. No.: WO2020/062338
PCT Pub. Date: Apr. 2, 2020

(65) Prior Publication Data
US 2021/0295714 A1    Sep. 23, 2021

(30) Foreign Application Priority Data

Sep. 30, 2018 (CN) .......................... 201811163146.2

(51) Int. Cl.
*G08G 5/00* (2006.01)
*G06F 17/18* (2006.01)

(52) U.S. Cl.
CPC ........... *G08G 5/0026* (2013.01); *G06F 17/18* (2013.01); *G08G 5/0013* (2013.01); *G08G 5/0039* (2013.01); *G08G 5/0043* (2013.01)

(58) Field of Classification Search
CPC .. G08G 5/0026; G08G 5/0013; G08G 5/0039; G08G 5/0043; G06F 17/18
See application file for complete search history.

(56) References Cited

U.S. PATENT DOCUMENTS 10,124,907 B1 * 11/2018 Gavrilets .............. B64C 27/006
2015/0370258 A1   12/2015 Fleureau et al.
(Continued)

FOREIGN PATENT DOCUMENTS

CN    103542852    1/2014
CN    103901892    7/2014
(Continued)

OTHER PUBLICATIONS

International Search Report, PCT/CN2018/109972, dated Jul. 2, 2019 (9 pages).

*Primary Examiner* — Frederick M Brushaber
*Assistant Examiner* — Elizabeth Yang
(74) *Attorney, Agent, or Firm* — Hamre, Schumann, Mueller & Larson, P.C.

(57) ABSTRACT

A method of generating a UAV migration trajectory includes: obtaining a drawn path on a map and preprocessing the drawn path to generate a first path; determining a candidate region of interest and sample viewpoints in a three-dimensional space according to sample points of the first path; determining a local candidate according to the candidate region of interest and the sample viewpoints, and obtaining a local candidate cost function; generating a local migration trajectory according to a path between different local candidates, and obtaining a local migration trajectory cost function of the local migration trajectory; and constructing a set travelling salesman problem according to the local candidate cost function and the local migration trajectory (Continued)

cost function, and solving the set travelling salesman problem to obtain a global migration trajectory.

20 Claims, 8 Drawing Sheets

(56) References Cited

U.S. PATENT DOCUMENTS

| | | | |
|---|---|---|---|
| 2015/0379874 A1 | 12/2015 | Ubhi et al. | |
| 2016/0328979 A1 | 11/2016 | Postrel | |
| 2017/0023937 A1* | 1/2017 | Loianno | G08G 5/0034 |
| 2019/0011921 A1* | 1/2019 | Wang | H04N 5/23299 |
| 2019/0145778 A1* | 5/2019 | Huang | G01C 21/20 |
| | | | 701/3 |
| 2019/0384283 A1* | 12/2019 | Chowdhary | G06V 20/17 |
| 2020/0404166 A1* | 12/2020 | Ono | G05D 1/0094 |
| 2021/0034075 A1* | 2/2021 | Daniel | B64C 39/024 |

FOREIGN PATENT DOCUMENTS

| | | |
|---|---|---|
| CN | 104807457 | 7/2015 |
| CN | 104867142 A | 8/2015 |
| CN | 105589471 | 5/2016 |
| CN | 106043694 A | 10/2016 |
| CN | 107278262 | 10/2017 |
| CN | 107943072 A | 4/2018 |
| CN | 108109437 | 6/2018 |
| CN | 108496134 A | 9/2018 |
| KR | 101894409 B1 | 9/2018 |
| WO | 2017/150433 A1 | 9/2017 |

\* cited by examiner

METHODS OF GENERATING A UNMANNED AERIAL VEHICLE MIGRATION TRAJECTORY, ELECTRONIC DEVICES AND STORAGE MEDIUMS

TECHNICAL FIELD

The present application relates to the field of UAV technology, and in particular to methods of generating a UAV migration trajectory, electronic devices and storage mediums.

BACKGROUND

The unmanned aerial vehicle (UAV) is a kind of intelligent flight device which does not need the pilot to drive directly and is controlled only by radio remote control or on-board program and has the advantages of small volume, simple structure, low cost, and can work in complex high altitude environment. With the development of UAV technology, more and more people use UAV to take images and aerial video.

However, most of the current aerial video is composed of a lot of short and simple aerial camera clips, and these aerial video clips are not continuous, because it is difficult to manipulate UAVs. At the same time, the artificial trajectory of the UAV is rough, it is difficult to use the UAV in a large, complex environment to make a continuous aerial video.

SUMMARY

According to various embodiments of the present disclosure, methods and apparatuses of generating a UAV migration trajectory, electronic devices and storage mediums are provided.

A method of generating a UAV migration trajectory includes:

obtaining a drawn path on a map and preprocessing the drawn path to generate a first path;

determining a candidate region of interest and sample viewpoints in a three-dimensional space according to sample points of the first path;

determining a local candidate according to the candidate region of interest and the sample viewpoints, and obtaining a local candidate cost function;

generating a local migration trajectory according to a path between different local candidates, and obtaining a local migration trajectory cost function of the local migration trajectory; and constructing a set travelling salesman problem according to the local candidate cost function and the local migration trajectory cost function, and solving the set travelling salesman problem to obtain a global migration trajectory.

An apparatus of generating a UAV migration trajectory includes:

a processing module configured to obtain a drawn path on a map and preprocess the drawn path to generate a first path;

a determining module configured to determine a candidate region of interest and sample viewpoints in a three-dimensional space according to sample points of the first path;

a local candidate determining module configured to determine a local candidate according to the candidate region of interest and the sample viewpoints, and obtain a local candidate cost function;

a local migration trajectory generating module configured to generate a local migration trajectory according to a path between different local candidates, and obtain a local migration trajectory cost function of the local migration trajectory; and a global migration trajectory generating module configured to construct a set travelling salesman problem according to the local candidate cost function and the local migration trajectory cost function, and solve the set travelling salesman problem to obtain a global migration trajectory.

An electronic device includes a memory and a processor, the memory has computer program stored therein which, when executed by the processor, cause the processor to provide the steps of: obtaining a drawn path on a map and preprocessing the drawn path to generate a first path; determining a candidate region of interest and sample viewpoints in a three-dimensional space according to sample points of the first path; determining a local candidate according to the candidate region of interest and the sample viewpoints, and obtaining a local candidate cost function; generating a local migration trajectory according to a path between different local candidates, and obtaining a local migration trajectory cost function of the local migration trajectory; and constructing a set travelling salesman problem according to the local candidate cost function and the local migration trajectory cost function, and solving the set travelling salesman problem to obtain a global migration trajectory.

One or more non-transitory computer-readable storage medium includes computer-executable instructions which, when executed by one or more processors, cause the one or more processors to provide the steps of: obtaining a drawn path on a map and preprocessing the drawn path to generate a first path; determining a candidate region of interest and sample viewpoints in a three-dimensional space according to sample points of the first path; determining a local candidate according to the candidate region of interest and the sample viewpoints, and obtaining a local candidate cost function; generating a local migration trajectory according to a path. between different local candidates, and obtaining a local migration trajectory cost function of the local migration trajectory; and constructing a set travelling salesman problem according to the local candidate cost function and the local migration trajectory cost function, and solving the set travelling salesman problem to obtain a global migration trajectory.

The details of one or more embodiments of the application are set forth in the accompanying drawings and the description below. Other features and advantages of the application will be apparent from the description, drawings, and claims

BRIEF DESCRIPTION OF THE DRAWINGS

To illustrate the technical solutions according to the embodiments of the present disclosure more clearly, the accompanying drawings for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments such that the technical solution and advantages of the present disclosure will be more apparent. It should be understood that the particular embodiments are described for the purpose of illustrating as opposed to restricting the present disclosure.

Figure 1:
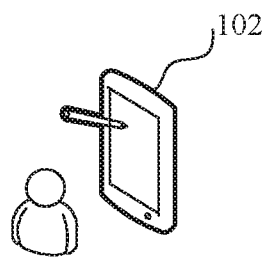
FIG. 1 is an application environment diagram of a method of generating a UAV migration trajectory according to an embodiment.

The method of generating a UAV migration trajectory provided in the embodiment of the disclosure may be applied to the application environment as shown in FIG. 1. The electronic device 102 may be, but is not limited to, a variety of personal computers, notebook computers, smartphones, tablet computers, and portable wearable devices, or may be a server. The electronic device 102 may individually implement the generation of the UAV migration trajectory; or may be implemented by communication with other electronic devices.

Figure 2:
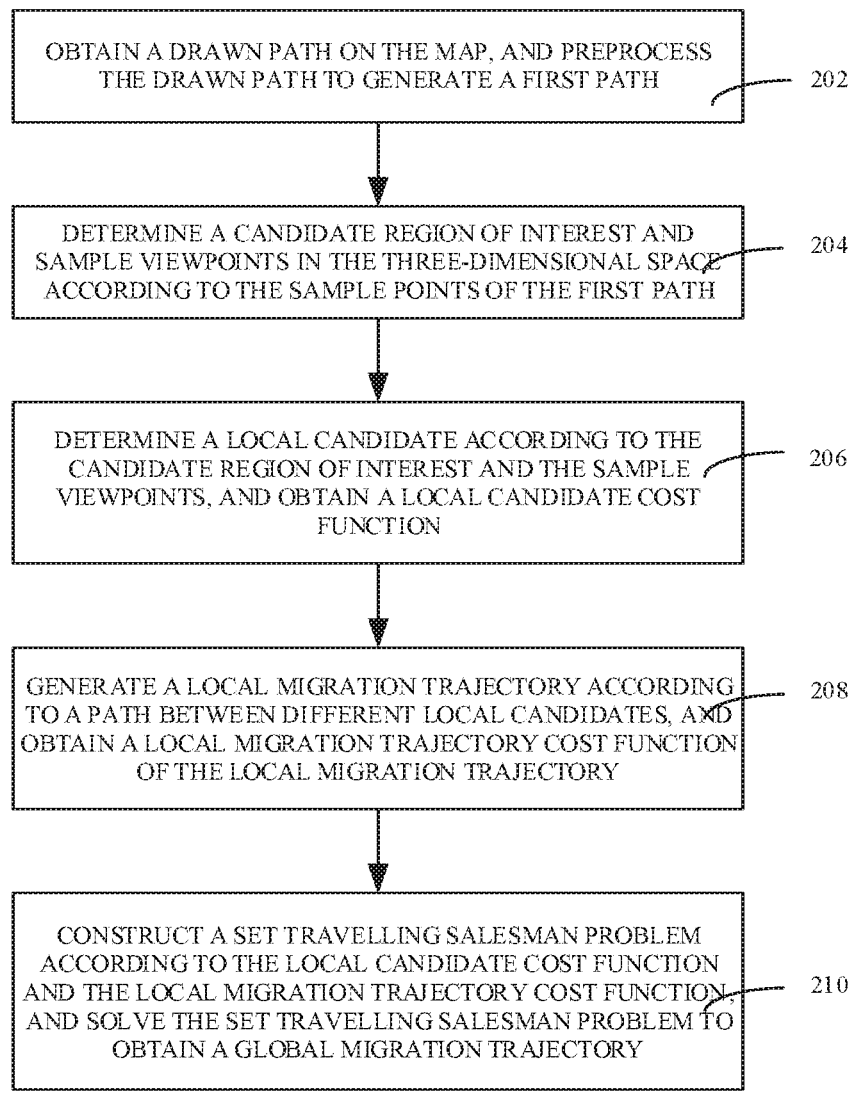
FIG. 2 is a flowchart of a method of generating a UAV migration trajectory according to an embodiment.

In an embodiment, as shown in FIG. 2, a method of generating a UAV migration trajectory is provided, with the method applied to the electronic device in FIG. 1 as an example, the method includes the steps of:

In step 202: obtain a drawn path on the map, and preprocess the drawn path to generate a first path.

The drawn path refers to a user's hand-drawn path on a map, which may be, but is not limited to, a variety of paper maps, electronic maps, and two-dimensional maps. The preprocessing refers to smoothing and sampling processing on the hand-drawn path, and the first path refers to the path after the smoothing and sampling processing.

Specifically, by shooting by itself, the electronic device may obtain a continuous hand-drawn path drawn on the map by the user, a hand-drawn path received from other electronic devices, or may be a hand-drawn path directly recorded on an electronic map. The hand-drawn path is generally rough and not smooth, and the electronic device needs to smooth the hand-drawn path and sample points on the smoothed path so that the simplified path is close to the original hand-drawn path. After preprocessing, the rough and dense hand-drawn path is simplified into a sparse and smooth new path. The new path is the first path, and the points on the first path are called sample points.

In step 204: determine a candidate region of interest and sample viewpoints in the three-dimensional space according to the sample points of the first path.

The region of interest refers to the region that the UAV may shoot. The candidate region of interest refers to a region of interest having the highest visual interest value within a preset range of each of the sample points of the first path. The sample viewpoints refer to points selected in a vertical line perpendicular to the surface where the sample points of the first path are located. These sampling points represent possible positions of the UAV.

Specifically, the electronic device presets each of the sample points on the first path with a range in which the region of interest having the highest visual interest value is found as the candidate region of interest. And the electronic device also determines a safe flight space of the UAV based on each of the sample points on the first path, the safe flight space is a region between the minimum and maximum flight altitudes of the UAV. After determining the safe flight space, the electronic device determines sample viewpoints in the three-dimensional space according to the sample points of the first path and the safe flight space.

In step 206: determine a local candidate according to the candidate region of interest and the sample viewpoints, and obtain a local candidate cost function.

The local candidate refers to the case where the UAV is shooting a candidate region of interest at one sample viewpoint, and the local candidate is determined according to the position and orientation of the UAV, the position refers to the sample viewpoint the UAV is located, and the orientation refers to the candidate region of interest the UAV is shooting.

Specifically, one sample viewpoint has a plurality of candidate regions of interest, and the UAV shooting different candidate regions of interest at the sample viewpoints has different local candidates. The electronic device determines a local candidate from the candidate region of interest and the sample viewpoints, and obtains a local candidate cost function. In the sample viewpoint A, for example, there are five candidate regions of interest a, b, c, d, e, the UAV may be shooting one of the candidate regions of interest when sampling the viewpoint a, then, the case where the UAV is shooting the candidate region of interest a at the sample viewpoint A is a local candidate, and the case where the UAV is shooting the candidate region of interest b at the sample viewpoint A is another local candidate. In both cases, the position of the UAV is the same, but the orientation is different, and it is considered to be two different local candidates. Similarly, where the UAV has the same orientation and different positions are considered to be two different local candidates.

In step 208: generate a local migration trajectory according to a path between different local candidates, and obtain a local migration trajectory cost function of the local migration trajectory.

The local migration trajectory refers to the migration path between two different local candidates. The local migration trajectory cost function is the function of finding the shortest migration trajectory between local candidates.

Specifically, the electronic device generates the local migration trajectory according to the path between two different local candidates, and obtains a local migration trajectory cost function of the local migration trajectory, the local migration trajectory cost function is related to the position and orientation of the UAV, the pitch angle of the camera, and the distance between the local candidates.

In step 210: construct a set travelling salesman problem according to the local candidate cost function and the local migration trajectory cost function, and solve the set travelling salesman problem to obtain a global migration trajectory.

The Set Traveling Salesman Problem (STSP) is a combination optimization problem in which the migration path of UAV is the shortest.

Specifically, the electronic device obtains the local candidate cost function and the local migration trajectory cost function, and converts the combined optimization model of the two functions into a generalized version of the travelling salesman problem, which is called a STSP. The optimal local candidates are obtained by solving the set travelling salesman problem, and the global migration trajectory is the sum of the migration trajectories of these optimal local candidates.

In the method of generating the migration trajectory of the UAV, the drawn path on the map is obtained by the electronic device and is preprocessed to obtain the first path; the candidate region of interest and the sample viewpoints are determined according to the sample points of the first path; then the local candidate cost function is determined and the local candidate cost function is obtained; the local migration trajectory is determined according to the path between different local candidates, and the local migration trajectory cost function is obtained; and the set travelling salesman problem is constructed and solved to obtain the global migration trajectory. The UAV flies and shoots according to the generated migration trajectory, and can shoot a safe and continuous video in a large and complex environment.

Figure 3:
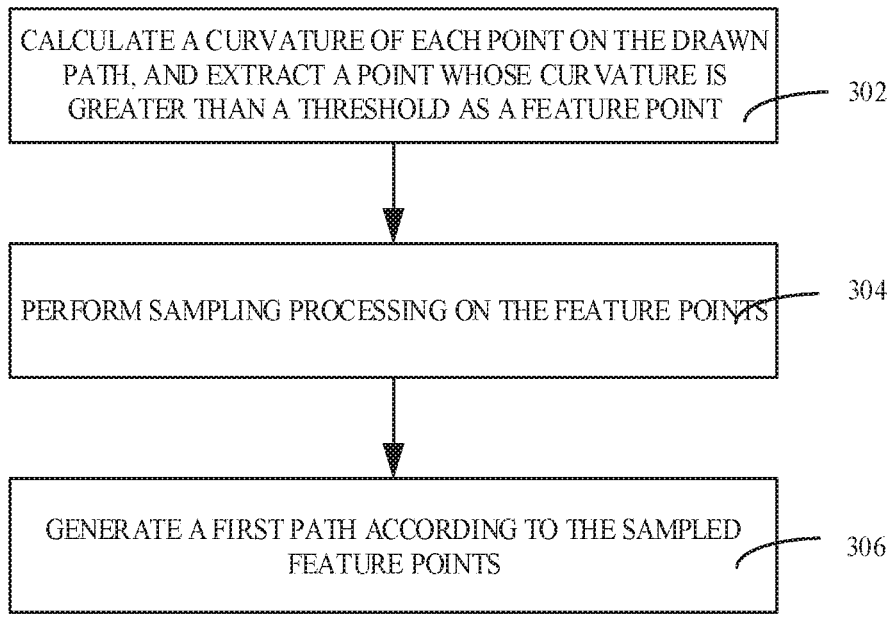
FIG. 3 is a flowchart of a preprocessing step according to an embodiment.

In an embodiment, as shown in FIG. 3, the step of obtaining the drawn path on the map and preprocessing the drawn path to generate the first path includes: smooth and sample the hand-drawn path and generate the first path according to the points after sample processing.

In step 302: calculate a curvature of each point on the drawn path, and extract a point whose curvature is greater than a threshold as a feature point.

The curvature is the rotation rate of the arc length with respect to the tangent direction angle of a certain point on the drawn path, indicating the degree of deviation of the drawn path from the straight line, and the larger the curvature is, the greater the bending degree of the drawn path.

Specifically, the step of smoothing the drawn path by the electronic device includes obtaining a point on the map constituting the drawn path, calculating a curvature of each point, and setting the point as a feature point if the curvature of the point is greater than a threshold value. For example, the electronic device calculates the curvature of each point of the drawn path using the finite difference method, assuming that the maximum curvature value of all points is c, the default setting value of 0.1c is a threshold value, and a point greater than the threshold value is set as a feature point, points smaller than the threshold value are removed from the drawn path, and the path obtained from the retained feature points is the smoothed path.

In step 304: perform sampling processing on the feature points.

Specifically, the electronic device may sample the feature points retained, in the drawn path in an equal-distance sampling manner, and select the feature points at the same distance intervals; and a feature-preserving morphological sampling method may also be adopted, i.e., selecting feature points capable of drawing the shape of the path, such as feature points where the path changes from a straight line to a curve, are selected when the direction of the path changes, the path formed by these selected feature points is closest to the original drawn path.

In step 306: generate a first path according to the sampled feature points.

Specifically, the new path generated according to the sampled feature points is referred to as a first path, and the first path after the sampling process is simplified from a rough dense path to a sparse and smooth path.

In the method of generating a UAV migration trajectory, the feature points are obtained by calculating the curvatures of the points on the drawn path, and the feature points are sampled, so that the rough and dense path is simplified to a sparse and smooth path, the memory space of the electronic device is saved.

Figure 4:
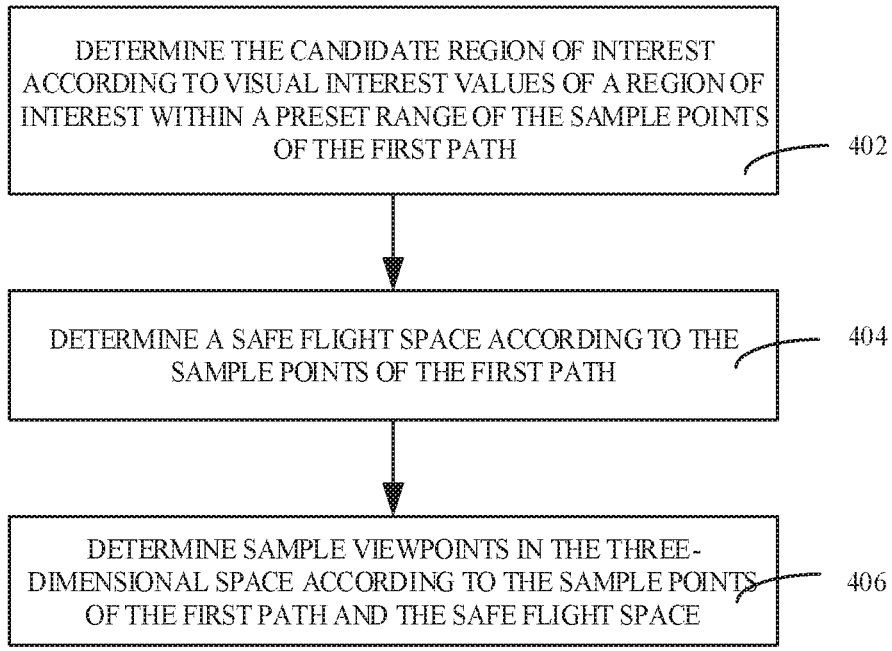
FIG. 4 is a flowchart of determining a candidate region of interest and sample viewpoints according to another embodiment.

In an embodiment, as shown in FIG. 4, the step of determining the candidate region of interest and the sample viewpoints in the three-dimensional space according to the sample points of the first path includes:

In step 402: determine the candidate region of interest according to visual interest values of a region of interest within a preset range of the sample points of the first path.

The sample points of the first path refers to feature points constituting the first path. The preset range refers to an area within a preset distance from the center with a sample point as the center. A visual interest value refers to the number of regions of interest.

Specifically, the electronic device selects a region of interest within a preset distance from the center with each of the sample points of the first path as the center, and the number of the regions of interest is a visual interest value. Within the preset range of the sample points, the region of interest having the highest visual interest value serves as a candidate region of interest for the sample point. For example, for each of the sample points, the region of interest is selected within a range of 150 meters of the point, in the ranges of the sample points, the maximum number of regions of interest is 5, the maximum value of the visual interest value of the region of interest is equal to 5, the 5 regions of interest are used as candidate regions of interest for all sample points.

In step 404: determine a safe flight space according to the sample points of the first path.

The safe flight space refers to the area between the minimum altitude and the maximum altitude that the UAV can fly.

Specifically, the electronic device sets the safe flight space of the UAV in the vertically upper region of the sample points of the first path, with reference to the ground where the sample points of the first path are located, sets an altitude vertically above the ground at which the sample points is located as a minimum altitude for the UAV, and sets another altitude as a maximum altitude for the UAV. The area between the minimum altitude and the maximum altitude set vertically above the ground where the sample points on the first path are located is the safe flight space in which the UAV can only fly.

In step 406: determine sample viewpoints in the three-dimensional space according to the sample points of the first path and the safe flight space.

Specifically, the electronic device selects sample viewpoints in the safe flight space above the sample points of the first path, the sampling strategy may, but is not limited to, sample every 10 meters between a minimum and maximum safety altitude, for example, if the minimum height of the safe flight space is 30 meters and the maximum height is 120 meters, the point at 40 meters and the point at 50 meters from the vertically upper region of the sample points of the first path are respectively the first sample viewpoint and the second sample viewpoint. Each of the sample points of the first path corresponds to a plurality of sample viewpoints in the safe flight space, and the sample viewpoints are different from each other by a certain distance, which ensures that the UAV has no collision at each sample viewpoints.

In an embodiment, the step of determining the safe flight space according to the sample points of the first path includes:

Obtain a first altitude and a second altitude configured relative to the ground where sample points of the first path are located, an area between the first altitude and the second altitude is a safe flight space; and Add a preset height to a height on the candidate region of interest to update the first height when the first height overlaps the candidate region of interest.

The first height is the height of the ground from where the sample points on the first path are located, the first height is the minimum height for the UAV flight. The second altitude is another altitude from the ground at which the sample points on the first path are located, the second altitude is the maximum altitude at which the UAV is flying.

Figure 5:
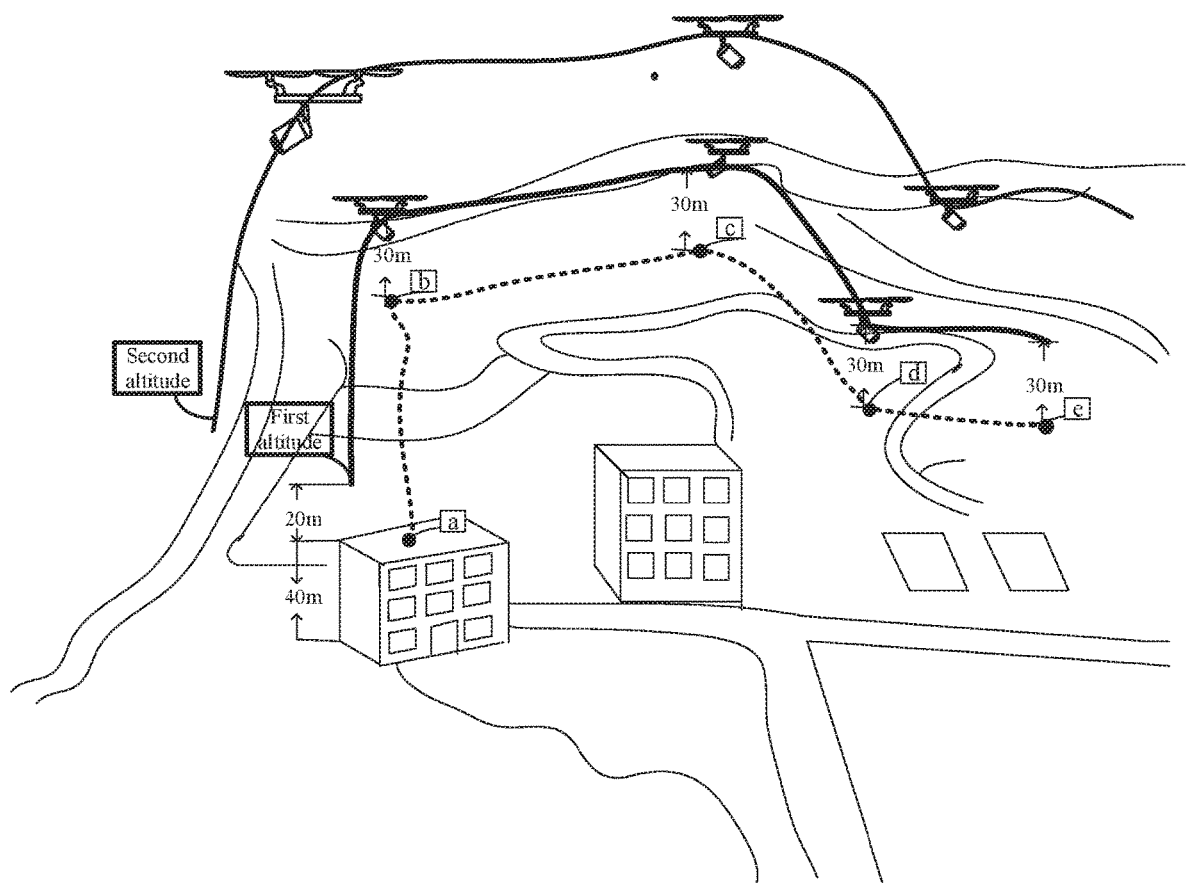
FIG. 5 is a schematic flowchart of a step of determining a safe flight space according to an embodiment.

Specifically, the electronic device obtains a first altitude and a second altitude of the UAV flight, the first altitude overlaps the candidate region of interest when the first altitude is less than the altitude of the candidate region of interest, then a preset height is added to the height on the candidate region of interest as a new first height. As shown in FIG. 5, the electronic device sets the ground at the position of the sample points a, b, c, d, e on the first path as a reference, and sets a height of 30 meters vertically above the ground at which each of the sample points is located as the first height, and the height of 120 meters from the ground is the second height. However, the position of the sample point a of the first path overlaps with the candidate region of interest A, the height on the candidate region of interest A is 40 meters, then the height of 40 meters of the candidate region of interest a is increased by 20 meters as the first height of 60 meters corresponding to the ground where the sample points a is located, while to the other sample points b, c, d, the first height corresponding to the ground where e is located is still 30 meters, and the second height corresponding to the ground where all sample points are located is constant. The safe flight space of the UAV is the area between the first altitude and the second altitude corresponding to the ground where each of the sample points is located. The safe flight space is determined by determining the minimum flight altitude and the maximum flight altitude of the UAV with respect to the ground where the sample points of the first path are located, so as to ensure the safety of the flight of the UAV.

In an embodiment, the step of obtaining the local candidate cost function includes:

Calculating a view quality of the local candidate from the candidate region of interest and the sample viewpoints; and Determining a local candidate cost function based on the view quality of the local candidate.

The local candidate view quality refers to the image quality of the UAV at one sampling point toward the center of each candidate region of interest.

Specifically, the electronic device calibrates the camera on the UAV to determine the values of the internal and external parameters of the camera. The internal parameters of the camera may include $f_x$, $f_y$, $c_x$, $c_y$, $f_x$ is the unit pixel size of the focal length in the x-axis direction of the image coordinate system; $f_y$ is the unit pixel size of the focal length in the y-axis direction of the image coordinate system; and $c_x$, $c_y$ are the principal point coordinates of the image plane. The principal point is the intersection of the camera optical axis and the image plane, $f_x = f/d_x$, $f_y = f/d_y$, f is the focal length of the single camera, $d_x$ is the width of one pixel in the x-axis direction of the image coordinate system, and $d_y$ is the width of one pixel in the y-axis direction of the image coordinate system. The image coordinate system is a coordinate system established with reference to a two-dimensional image captured by a camera, and is used to specify a position of an object in the captured image. The origin of the (x, y) coordinate system in the image coordinate system is located at the focal point ($c_x$, $c_y$) of the camera optical axis and the imaging plane in units of length, that is, meters, the origin of the (u, v) coordinate system in the pixel coordinate system is in the upper left corner of the image and in units of quantities, i.e., numbers. And (x, y) is for characterizing the perspective projection relationship of the object from the camera coordinate system to the image coordinate system and (u, v) is for characterizing the pixel coordinates. The conversion relationship between (x, y) and (u, v) is as follows:

$$u = \frac{x}{d_x} + c_x$$
$$v = \frac{y}{d_y} + c_y$$

Equation (1)

The perspective projection is a kind of one-sided projection which is close to the visual effect by projecting the shape onto the projection surface by the central projection method.

The external parameters of the camera include a rotation matrix and a translation matrix in which coordinates in the world coordinate system are converted to coordinates in the camera coordinate system. The world coordinate system reaches the camera coordinate system through rigid body transformation, and the camera coordinate system reaches the image coordinate system through perspective projection transformation. Rigid body transformation refers to the motions of rotation and translation on a geometric object when the object is not subject to deformation in three-dimensional space, i.e., rigid body transformation. Rigid body transformation is as shown in Equation (2):

$$\begin{bmatrix} X_c \\ Y_c \\ Z_c \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} X \\ Y \\ Z \end{bmatrix} + \begin{bmatrix} t_x \\ t_y \\ t_z \end{bmatrix}$$

$$X_c = RX + T,$$

$$X_c = \begin{bmatrix} X_c \\ Y_c \\ Z_c \end{bmatrix},$$

$$R = \begin{bmatrix} r_{11} & r_{12} & r_{13} \\ r_{21} & r_{22} & r_{23} \\ r_{31} & r_{32} & r_{33} \end{bmatrix},$$

$$X = \begin{bmatrix} X \\ Y \\ Z \end{bmatrix}$$

$$T = \begin{bmatrix} t_x \\ t_y \\ t_z \end{bmatrix}$$

Equation (2)

$X_c$ is a camera coordinate system, X is a world coordinate system, R is a rotation matrix from the world coordinate system to the camera coordinate system, and T is a translation matrix from the world coordinate system to the camera coordinate system are represented. The distance between the origin of the world coordinate system and the origin of the camera coordinate system is mutually controlled by the components in the directions of x, y, and z axes, and has three degrees of freedom, R is the sum of the effects of rotating around the X, Y, and Z axes, respectively, $t_x$ is the amount of translation in the x axis direction, $t_y$ is the amount of translation in the y axis direction, and $t_z$ is the amount of translation in the z axis direction.

The world coordinate system is the absolute coordinate system of the objective three-dimensional space and can be established at any position. For example, for each calibration image, the world coordinate system may be established with the upper left corner of the calibration plate as the origin, the calibration plate plane as the XY plane, and the Z axis perpendicular to the calibration plate plane upward. The camera coordinate system takes the camera optical center as the origin of the coordinate system, and the optical axis of the camera as the Z-axis, and the X-axis and the Y-axis are respectively parallel to the X-axis and Y-axis of the image coordinate system. The principal point of the image coordinate system is the intersection of the optical axis and the image plane. The image coordinate system takes the main point as the origin. The pixel coordinate system means that the origin is defined at the upper left corner of the image plane. The electronic device uses the virtual camera with the same internal and external parameters of the camera on the UAV to render the current angle of view to obtain a visual interest map $I(x)$.

At the same time, a weight graph $I^w$ is calculated based on the central method of aerial photography aesthetic rules and the trichotomy method, in which the central method refers to the composition method in which the subject is placed at the center of the picture. The trichotomy, also known as the well-character mapping method, is a composition method in which the scene is divided into 9 squares by two horizontal lines and two vertical lines to obtain 4 intersections, and then the emphasis to be expressed is placed in any one of the intersections. The point multiplication result $Q(x)=I(x) \cdot I^w$ of the visual interest map $I(x)$ and the weight map $I^w$ is the view quality of the UAV in the local candidate. Then, a local candidate cost function is obtained according to the view quality $Q(x)$ of the local candidate, and the local candidate cost function can be expressed as.

$$E_{local}(x) = 1 - Q(x) \qquad \text{Equation (3)}$$

In an embodiment, the cost function of the local migration trajectory is related to the orientation of the UAV, the pitch angle of the camera, and the distance between the local candidates.

Specifically, the cost function of the local migration trajectory may be expressed as:

$$E_{trans}(T_{(i,j),(i+1,k)}) = w_h * E_h \cdot H_p + w_p * E_p \qquad \text{Equation (4)}$$

$T_{(i,j),(i+1,k)}$ is the transition locus between the j-th partial candidate of the i-th hand-drawn sample points to the k-th partial candidate of the i+1-th hand-drawn sample points is shown. $E_k$ represents an orientation change rate between the local candidates $x_{(i,j)}$ and $x_{(i+1,j)}$, which may be expressed as:

$$E_h = \frac{|h(x_{(i,j)}) - h(x_{(i+1,k)})|}{d(x_{(i,j)}, x_{(i+1,k)})},$$

$h(x)$ is the orientation of the local candidate x, $d(x_{(i,j)}, x_{(i+1,k)})$ is the distance between the two local candidates. $H_p$ is a penalty term indicating that the orientation of the UAV changes too much between the two local candidates, which can be expressed as $$H_p = \exp\left(\frac{|h(x_{(i,j)}) - h(x_{(i+1,k)})| - 120}{360}\right).$$

$E_p$ is a change rate in camera pitch angle between local candidates $x_{(i,j)}$ and $x_{(i+1,k)}$, the change rate in camera pitch angle may be expressed as:

$$E_p = \frac{|p(x_{(i,j)}) - p(x_{(i+1,k)})|}{d(x_{(i,j)}, x_{(i+1,k)})},$$

$P(x)$ is the pitch angle of the local candidate camera. $w_k$ is the weight of the UAV's orientation, $w_p$ is the camera's pitch angle, $w_k$ and $w_p$ are preset values, $w_k=0.8$, $w_p=0.2$. By determining the local migration trajectory cost function through the orientation of the UAV, the camera pitch angle and the distance between the local candidates, the optimal local candidate can be obtained by combining the local candidate cost function, thereby obtaining the UAV migration trajectory that can shoot safe and continuous videos.

In an embodiment, the method of generating a UAV migration trajectory further includes:

Determining the flight speed of the UAV at each local candidate according to at least one of the UAV orientation change rate and the pitch angle change rate in the global migration trajectory.

Specifically, the electronic equipment obtains the global migration trajectory of the UAV and calculates the flight speed of each local candidate of the UAV, and the calculation method can be expressed as follows:

$$\max \sum_i w(i) * v_i^2 - \lambda(v_i - v_{i-1})^2 \qquad \text{Equation (5)}$$

$$w(i) = \log_{\frac{1}{2}}\left(w_h * \frac{|h_i - h_{i-1}|}{d(i, i+1)} + w_p * \frac{|p_i - p_{i-1}|}{d(i, i+1)}\right),$$

$$0 \le v_i \le 15$$

i is the local candidate, w(i) is the speed variation amount of the local candidate i, $h_i$ is the orientation of the UAV, and $p_i$ is the pitch angle of the camera of the UAV. The weighting function w(i) controls the increasing or decreasing of the speed so that the UAV can fly at an appropriate speed in the event of a change in orientation or a change in the pitch angle of the camera. $\lambda(v_i - v_{i-1})^2$ is a smooth term, which makes the speed variation be to smooth and reasonable when the UAV transitions between different local candidate migration trajectories. By calculating the speed of the UAV, the speed of the UAV at each local candidate is determined, and the variation of the UAV speed is smooth and reasonable, so that the visual stability of the aerial video is not affected by the excessive speed variation rate of the UAV in flight.

Figure 6:
FIG. 6 is a flowchart of a method of generating a UAV migration trajectory according to an embodiment.

In an embodiment, as shown FIG. 6, a method of generating a UAV migration trajectory includes:

In step 602, obtain a drawn path on a map, a curvature of each point on the drawn path is calculated, and extract a point whose curvature is greater than a threshold value as a feature point.

In step 604: perform sampling processing on the feature points, and generate a first path according to the sampled feature points.

In step 606: determine a candidate region of interest according to the visual interest value of the region of interest within a preset range of the sample points of the first path.

In step 608: obtain a first altitude and a second altitude configured relative to a ground where sample points of the first path are located, an area between the first altitude and the second altitude is a safe flight space.

In step 610: add a preset height to a height on the candidate region of interest to update the first height when the first height overlaps the candidate region of interest.

In step 612: determine sample viewpoints in the three-dimensional space according to the sample points of the first path and the safe flight space.

In step 614: determine a local candidate according to the candidate region of interest and the sample viewpoints, and calculate a view quality of the local candidate.

In step 616: determine a local candidate cost function according to a view quality of the local candidate.

In step 618: generate a local migration trajectory according to a path between different local candidates, and obtain a local migration trajectory cost function of the local migration trajectory.

In step 620: construct a set travelling salesman problem according to the local candidate cost function and the local migration trajectory cost function, and solve the set travelling salesman problem to obtain a global migration trajectory.

In an embodiment, the solution is described according to an application example of the method of generating a UAV migration trajectory.

The UAV control system can use the software platform based on DJI WayPointMission SDK (Software Development Kit) to control UAV flight and shoot video. Using this SDK, you can specify the waypoint sequence and accurately specify the UAV's physical location, orientation, and camera pitch angle at each waypoint, as well as the UAV's speed. There is a slight error between the actual flight trajectory and the planned aerial migration trajectory, which is mainly caused by the unstable GPS signal and the influence of wind speed. The portable but powerful UAV's DJI Phantom 4 Pro V2.0 can be used to shoot aerial video in the field. The flight movements of the UAV includes moving forward, backward, left or right along the horizontal axis, increasing and decreasing its height, and changing its direction clockwise or counterclockwise. The UAV is equipped with a 4K/30 fps 12 megapixel camera that can tilt between 0 and 90 degrees. The UAV will fly between waypoints, perform actions at waypoints, and adjust the orientation, altitude, pitch and speed between waypoints. The actual migration trajectory of the UAV is basically the same as the migration trajectory generated by the system.

The electronic device obtains an aerial photographing result of a path obtained by a user using two methods, one is a path generated by the method of the present solution, and the other is a path designed using a DJI GS PRO tool. According to the designed questions and the user's answers, the results of aerial photographs of the paths generated by the two methods are compared. In the specific process, six users first use the method of the embodiment of the application to obtain the global migration trajectory of the UAV, and then use the DJI GS PRO tool to design a similar migration trajectory, including specifying the waypoint position, set the altitude, orientation and pitch angle of the UAV at each waypoint, so that the UAV can take aerial video along the generated UAV migration trajectory and the trajectory designed by DJI GS PRO.

The users' usage ratings are obtained. By providing some aerial video to the users to judge, and collecting the users' answers to evaluate and analyze aerial photography results of the paths generated by the two methods. The questions offered to the user are: 1) a more enjoyable aerial video, 2) a better preview of the scene, 3) more desirable to the user. The options provided to the user are: 1) the left video is more enjoyable, 2) the left video provides a better preview of the entire scene, 3) the left video is more desirable. The answers provided to the user are: 1) totally agree, 2) basically agree, 3) neutral, 4) basically disagree, 5) totally disagree. See Table 1 and FIG. 7, FIG. 8 and FIG. 9 for evaluation results.

Figure 7:
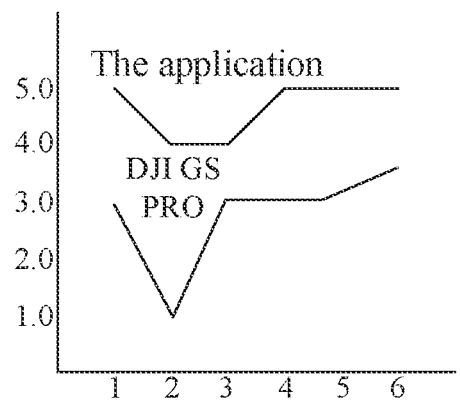
FIG. 7 is a line chart of an evaluation result of an aerial video according to an embodiment.
Figure 8:
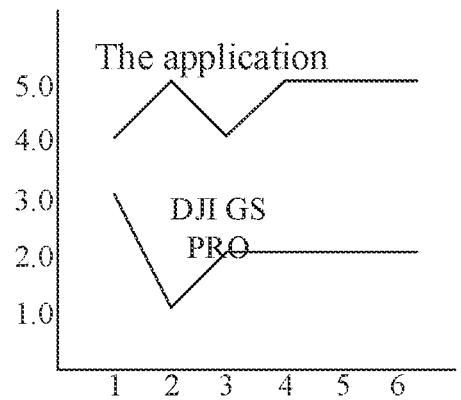
FIG. 8 is a line chart of an evaluation result of a preview scene according to an embodiment.
Figure 9:
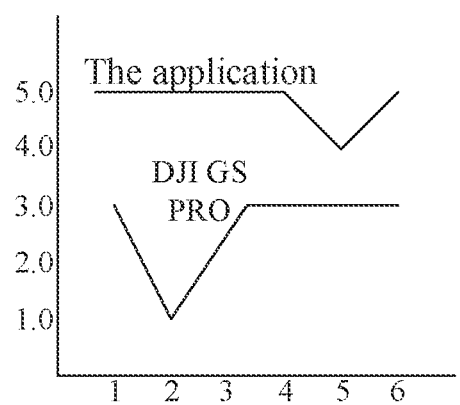
FIG. 9 is a line chart of an evaluation result of a demand expectation according to an embodiment.

FIG. 7, FIG. 8, and FIG. 9 show the evaluation results of Problems 1) to 3). FIG. 7 shows the result of the selection of Problem 1) that the video captured according to the UAV migration trajectory generated according to the embodiment of the application is superior to the DJI GS PRO version. According to the feedbacks of the users, when using the DJI GS PRO, most users find it difficult to estimate the height, orientation, and pitch angle that should be set for photographing the candidate region of interest. According to the video results, the UAV can only capture part of the candidate region of interest when flying along some trajectory designed by DJI GS PRO, and even difficult to capture the candidate region of interest. For the same reason, for Problem 3), as shown in FIG. 9, most users believe that the aerial shot video of the UAV migration trajectory generated according to the embodiments of the application better satisfies their needs. For problem 2), it can be seen from FIG. 8 that the embodiments of the application provides a preview scene better than the DJI GS PRO version, and when the scene is more complex, DJI GS PRO may only consider shooting specific regions of interest when planning the path. However, the method of generating a UAV migration trajectory of the embodiments of the application consider K regions of interest with the highest visual interest value within 150 meters of the sample points, and comprehensively consider the visual interest value, the direction change and the pitch angle change, and then determines the optimum altitude, orientation and pitch angle for each waypoint.

TABLE 1

Statistical Table of Time and Battery Consumption of the Embodiments of the Application and DJI GS PRO:

| | Time consumption | | Battery consumption | |
| --- | --- | --- | --- | --- |
| Users | Embodiments of the Application | DJI GS PRO | Embodiments of the Application | DJI GS PRO |
| 1 | 2 s + 4 s | 20 m | 32% (1) | 120% (2) |
| 2 | 3 s + 4 s | 40 m | 38% (1) | 300% (5) |
| 3 | 1 s + 2 s | 15 m | 18% (1) | 144% (3) |
| 4 | 1 s + 2 s | 10 m | 12% (1) | 130% (3) |
| 5 | 2 s + 4 s | 30 m | 40% (1) | 160% (3) |
| 6 | 2 s + 4 s | 32 m | 35% (1) | 175% (4) |

In the battery consumption; 100% means that one battery is consumed. The number of times in parentheses indicates the user's path modification and the number of reshoots. Some quantitative statistics is carried out on the uses of the system constructed according to the methods of the embodiments of the application and of the DJI GS PRO to collect statistics of time consumption and battery consumption. For embodiments of the application, the time consumption includes a time for the user to include drawing a sketch path and a calculation time required to generate a trajectory. For the DJI GS PRO, the time consumption includes the time that the user sets each waypoint and specifies the altitude, orientation, and pitch angle for each waypoint.

From the statistical results in Table 1, it can be seen that the time consumption of the embodiments of the application is short, and the time consumed by using the DJI GS PRO tool is relatively large, mainly because the user needs to repeatedly set the UAV configuration information at each waypoint. From the comparison of battery consumption, it can be seen that embodiments of the application save a large amount of battery energy. Most users who use the DJI GS PRO need to modify the path and re-shoot the video 2 to 5 times because of poor aerial photography.

In the above embodiment, by evaluating and analyzing the result of aerial photography of the paths generated by the user use two methods, the advantages of the application with respect to other solutions can be clearly demonstrated, and the advantages of the method of generating a UAV migration trajectory provided by the application is further demonstrated.

It should be understood that although the steps in FIGS. 1-9 are sequentially displayed as indicated by arrows, these steps are not necessarily sequentially performed as indicated by arrows. Unless explicitly stated herein, the execution of these steps is not strictly sequential, and the steps may be performed in other sequences. Moreover, at least a part of the steps in FIGS. 1-9 may include a plurality of sub-steps or stages that are not necessarily performed at the same time, but may be performed at different times, and the order of execution of the sub-steps or stages is not necessarily performed sequentially, but may be performed in turn or alternately with at least a part of other steps or sub-steps or stages of other steps.

Figure 10:
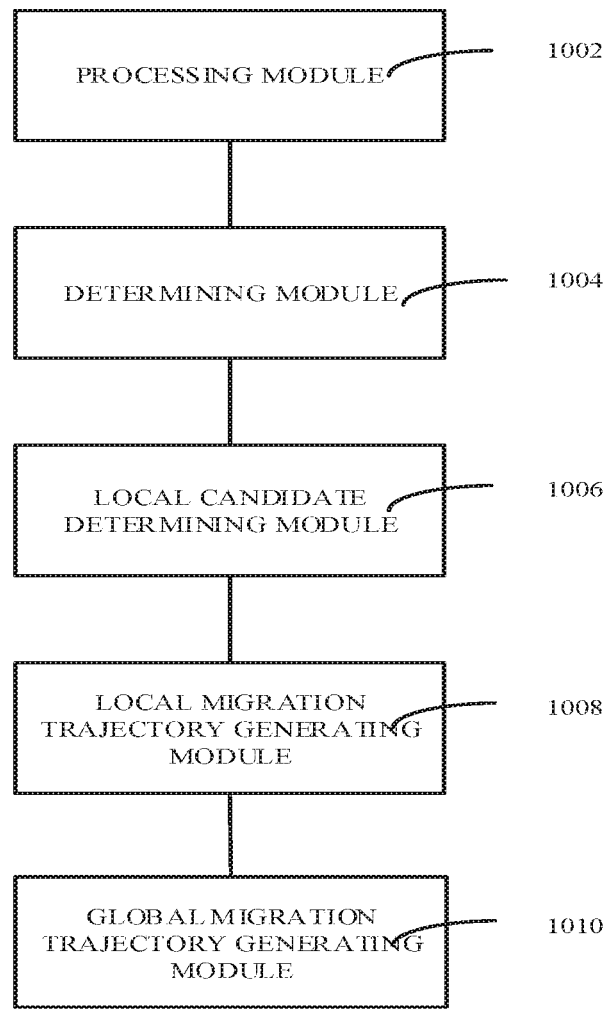
FIG. 10 is a block diagram of an apparatus of generating a UAV migration trajectory according to an embodiment.

In an embodiment, as shown in FIG. 10, an apparatus of generating a UAV migration trajectory is provided, which includes a processing module 1002, a determining module 1004, a local candidate determining module 1006, a local migration trajectory generating module 1008, and a global migration trajectory generating module 1010:

The processing module 1002 is configured to obtain a drawn path on a map and preprocess the drawn path to generate a first path;

The determining module 1004 configured to determine a candidate region of interest and sample viewpoints in a three-dimensional space according to sample points of the first path;

The local candidate determining module 1006 is configured to determine a local candidate according to the candidate region of interest and the sample viewpoints, and obtain a local candidate cost function;

The local migration trajectory generating module 1008 is configured to generate a local migration trajectory according to a path between different local candidates, and obtain a local migration trajectory cost function of the local migration trajectory; and The global migration trajectory generating module 1010 is configured to construct a set travelling salesman problem according to the local candidate cost function and the local migration trajectory cost function, and solve the set travelling salesman problem to obtain a global migration trajectory.

In the apparatus of generating the migration trajectory of the UAV, the drawn path on the map is obtained by the electronic device and is preprocessed to obtain the first path; the candidate region of interest and the sample viewpoints are determined according to the sample points of the first path; then the local candidate cost function is determined and the local candidate cost function is obtained; the local migration trajectory is determined according to the path between different local candidates, and the local migration trajectory cost function is obtained; and the set travelling salesman problem is constructed and solved to obtain the global migration trajectory. The UAV flies and shoots according to the generated migration trajectory; and can shoot a safe and continuous video with aerial esthetics.

In an embodiment, the processing module 1002 is further configured to calculate a curvature of each point on the drawn path, and extract a point whose curvature is greater than a threshold as a feature point; perform sampling processing on the feature points; and generate the first path according to the sampled feature points. In the method of generating the UAV migration trajectory, the feature points are obtained by calculating the curvatures of the points on the drawn path, and the feature points are sampled, so that the rough and dense path is simplified into a sparse and smooth path, the calculation amount is reduced, and the memory space of the electronic device is saved.

In an embodiment, the determining module 1004 is further configured to determine the candidate region of interest according to visual interest values of a region of interest within a preset range of the sample points of the first path; determine a safe flight space according to the sample points of the first path; and determine sample viewpoints in the three-dimensional space according to the sample points of the first path and the safe flight space. In the apparatus, the safe flight space is determined by sample points of the first path, and a plurality of sample viewpoint are determined in the safe flight space, and the sample viewpoints are different from each other by a certain distance, thereby ensuring that the UAV has no collision on at each sample viewpoint.

In an embodiment, the determining module 1004 is further configured to obtain a first altitude and a second altitude configured relative to a ground where sample points of the first path are located, an area between the first altitude and the second altitude is a safe flight space; and add a preset height to a height on the candidate region of interest to update the first height when the first height overlaps the candidate region of interest. The safe flight space is determined by determining the minimum flight altitude and the maximum flight altitude relative to a ground where sample points of the first path are located, so as to ensure the safety of the flight of the UAV.

In an embodiment, the determining module 1006 is further configured to calculate a view quality of the local candidate from the candidate region of interest and the sample viewpoints; and determine a local candidate cost function based on the view quality of the local candidate. The local candidate cost function is determined by determining the view quality of the local candidate, which reduces the amount of computation and improves the efficiency of the operation of the electronic device.

In an embodiment, the apparatus of generating a UAV migration trajectory further includes a speed controlling module, configured to determine a flight speed of the UAV at each local candidate based on at least one of an orientation change rate and a pitch change rate of the UAV in the global migration trajectory. The speed controlling module of the apparatus of generating the UAV migration trajectory determines the speed of the UAV at each local candidate through the calculation of the UAV speed, and the change of the UAV speed is smooth and reasonable, so as to avoid affecting the visual stability of the aerial video shooting due to the excessive change of the speed of flight of the UAV.

For the specific definition of the apparatus of generating a UAV migration trajectory, reference can be made to the foregoing definition of the method of generating a UAV migration trajectory and is omitted for brevity. The various modules in the apparatus of generating a UAV migration trajectory described above may be implemented in whole or in part by software, hardware, and combinations thereof. The modules may be embedded in or independent from a processor in the computer device and in the form of hardware, or may be stored in a memory in the computer device and in the form of software to be called by the processor to perform the operations corresponding to the modules.

Figure 11:
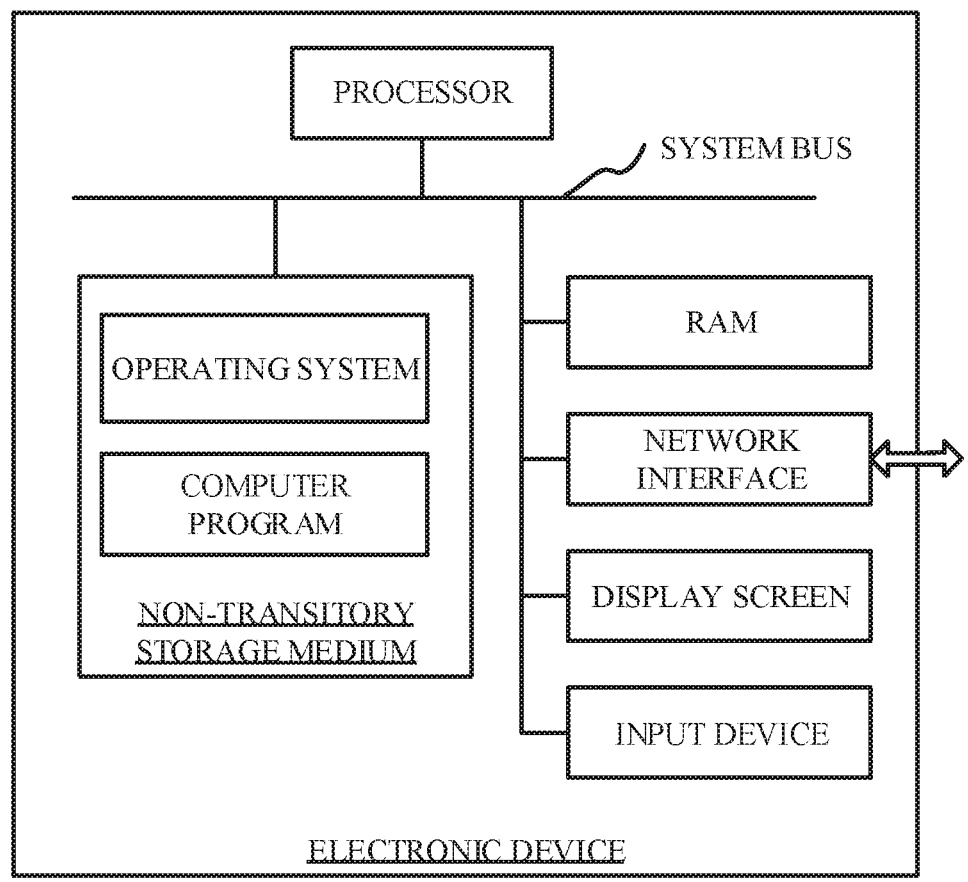
FIG. 11 is a schematic diagram of an electronic device according to an embodiment.

In an embodiment, an electronic device is provided, the internal structure diagram may be as shown in FIG. 11. The electronic device includes a processor, a memory, a network interface, a display screen, and an input device connected through a system bus. The processor of the electronic device is configured to provide computing and control capabilities. The memory of the electronic device includes non-volatile storage medium and a Random Access Memory (RAM). The non-transitory storage medium stores an operating system and a computer program. The RAM provides an environment for the operation of an operating system and the computer program in the non-volatile storage medium. The network interface of the electronic device is configured to communicate with external terminals via a network connection. The computer program is executed by the processor to implement a method of generating a UAV migration trajectory. The display screen of the electronic device may be a liquid crystal display screen or an electronic ink display screen, and the input device of the electronic device may be a touch layer covered on the display screen, or be a key, a trackball or a touch pad set on the housing of the electronic device, or may be an external keyboard, touch pad or mouse.

Those skilled in the art will appreciate that the structure shown in FIG. 11 is merely a block diagram of a portion of the structure associated with the solution of the application, and does not constitute a limitation on the electronic device to which the solution of the present disclosure is applied, a particular electronic device may include more or fewer components, or combine certain components, or with a different arrangement of components.

In an embodiment, an electronic device is provided, which includes a memory and a processor, the memory has computer program stored therein which, when executed by the processor, causes the processor to provide the steps of: obtaining a drawn path on a map and preprocessing the drawn path to generate a first path; determining a candidate region of interest and sample viewpoints in a three-dimensional space according to sample points of the first path; determining a local candidate according to the candidate region of interest and the sample viewpoints, and obtaining a local candidate cost function; generating a local migration trajectory according to a path between different local candidates, and obtaining a local migration trajectory cost function of the local migration trajectory; and constructing a set travelling salesman problem according to the local candidate cost function and the local migration trajectory cost function, and solving the set travelling salesman problem to obtain a global migration trajectory.

In an embodiment, an computer-readable storage medium is provided, which includes a computer program which, when executed by the processor, causes the processor to provide the steps of: obtaining a drawn path on a map and preprocessing the drawn path to generate a first path; determining a candidate region of interest and sample viewpoints in a three-dimensional space according to sample points of the first path; determining a local candidate according to the candidate region of interest and the sample viewpoints, and obtaining a local candidate cost function; generating a local migration trajectory according to a path between different local candidates, and obtaining a local migration trajectory cost function of the local migration trajectory; and constructing a set travelling salesman problem according to the local candidate cost function and the local migration trajectory cost function, and solving the set travelling salesman problem to obtain a global migration trajectory.

Persons of ordinary skill in the art understand that all or part of the processes in the methods of the foregoing embodiments may be implemented by a computer program instructing relevant hardware. The computer program may be stored in a non-transitory computer-readable storage medium. When the computer program is executed, flows of embodiments of the methods as described above may be included. Any references to memory, storage, databases, or other media used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. By way of illustration and not limitation, RAM is available In a variety of forms such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Memory Bus (Rambus) Direct RAM (RDRAM), Direct Memory Bus Dynamic RAM (DRDRAM), Memory Bus Dynamic RAM (RDRAM) etc.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method of controlling an unmanned aerial vehicle (UAV), comprising:
    drawing a drawn path on a map;
    obtaining, by an electronic device, the drawn path on the map;
    sampling and smoothing the drawn path to generate a first path;
    determining a candidate region of interest and sample viewpoints in a three-dimensional (3D) space according to sample points of the first path;
    determining a local candidate according to the candidate region of interest and the sample viewpoints, and obtaining a local candidate cost function;

generating a local migration trajectory according to a path between different local candidates, and obtaining a local migration trajectory cost function of the local migration trajectory;

constructing a set travelling salesman problem according to the local candidate cost function and the local migration trajectory cost function, and solving the set travelling salesman problem to obtain a global migration trajectory;

controlling flying of the UAV based on the global migration trajectory; and controlling a camera of the UAV to capture images or videos along the global migration trajectory, wherein the sample points of the first path refer to feature points constituting the first path; and the sample viewpoints refer to points selected in a vertical line perpendicular to a surface where the sample points of the first path are located, wherein the obtaining the drawn path on the map and sampling and smoothing the drawn path to generate the first path comprises:

calculating a curvature of each point on the drawn path, and extracting a point whose curvature is greater than a threshold as a feature point;

performing sampling processing on the feature points; and generating the first path according to the sampled feature points.

2. The method according to claim 1, wherein the determining the candidate region of interest and the sample viewpoints in the three-dimensional space according to the sample points of the first path comprises:

determining the candidate region of interest according to visual interest values of a region of interest within a preset range of the sample points of the first path;

determining a safe flight space according to the sample points of the first path; and determining sample viewpoints in the three-dimensional space according to the sample points of the first path and the safe flight space.

3. The method according to claim 2, wherein the determining the candidate region of interest according to the visual interest values of the region of interest within the preset range of the sample points of the first path comprises:

determining the visual interest values of the region of interest within the preset range of the sample points of the first path; and determining the candidate region of interest from a maximum value of the visual interest values.

4. The method according to claim 2, wherein the determining the safe flight space according to the sample points of the first path comprises:

obtaining a first altitude and a second altitude configured relative to a ground where sample points of the first path are located, an area between the first altitude and the second altitude is a safe flight space; and adding a preset height to a height on the candidate region of interest to update the first height when the first height overlaps the candidate region of interest.

5. The method according to claim 1, wherein the obtaining the local candidate cost function comprises:

calculating a view quality of the local candidate from the candidate region of interest and the sample viewpoints; and determining a local candidate cost function based on the view quality of the local candidate.

6. The method according to claim 1, wherein the local migration trajectory cost function is related to an orientation of the UAV, a pitch angle of the camera, and a distance between the local candidates.

7. The method according to claim 1, wherein the method further comprises:

determining a flight speed of the UAV at each local candidate based on at least one of an orientation change rate and a pitch change rate of the UAV in the global migration trajectory.

8. The method according to claim 1, wherein the method further comprises:

determining a speed variation of the UAV at each local candidate according to at least one of the UAV orientation change rate and the pitch angle change rate in the global migration trajectory;

determining a speed maximum value of the migration of the UAV between the local candidates according to the speed variation of the UAV in each local candidate; and controlling the flight speed of the UAV at each local candidate to be less than a maximum speed.

9. An electronic device, comprising a memory and a processor, the memory having computer program stored therein for controlling an unmanned aerial vehicle (UAV) which, when executed by the processor, causing the processor to provide the steps of:

drawing a drawn path on a map;

obtaining, by an electronic device, the drawn path on the map;

sampling and smoothing the drawn path to generate a first path;

determining a candidate region of interest and sample viewpoints in a three-dimensional space according to sample points of the first path;

determining a local candidate according to the candidate region of interest and the sample viewpoints, and obtaining a local candidate cost function;

generating a local migration trajectory according to a path between different local candidates, and obtaining a local migration trajectory cost function of the local migration trajectory;

constructing a set travelling salesman problem according to the local candidate cost function and the local migration trajectory cost function, and solving the set travelling salesman problem to obtain a global migration trajectory;

controlling flying of the UAV based on the global migration trajectory; and controlling a camera of the UAV to capture images or videos along the global migration trajectory, wherein the sample points of the first path refer to feature points constituting the first path; and the sample viewpoints refer to points selected in a vertical line perpendicular to a surface where the sample points of the first path are located, wherein the obtaining the drawn path on the map and sampling and smoothing the drawn path to generate the first path comprises:

calculating a curvature of each point on the drawn path, and extracting a point whose curvature is greater than a threshold as a feature point;

performing sampling processing on the feature points; and generating the first path according to the sampled feature points.

10. The electronic device according to claim 9, wherein the processor is further caused to perform the steps of:

determining the candidate region of interest according to visual interest values of a region of interest within a preset range of the sample points of the first path;

determining a safe flight space according to the sample points of the first path; and determining sample viewpoints in the three-dimensional space according to the sample points of the first path and the safe flight space.

11. The electronic device according to claim 10, wherein the processor is further caused to perform the steps of:

determining the visual interest values of the region of interest within the preset range of the sample points of the first path; and determining the candidate region of interest from a maximum value of the visual interest values.

12. The electronic device according to claim 10, wherein the processor is further caused to perform the steps of:

obtaining a first altitude and a second altitude configured relative to a ground where sample points of the first path are located, an area between the first altitude and the second altitude is a safe flight space; and adding a preset height to a height on the candidate region of interest to update the first height when the first height overlaps the candidate region of interest.

13. The electronic device according to claim 9, wherein the processor is further caused to perform the steps of:

calculating a view quality of the local candidate from the candidate region of interest and the sample viewpoints; and determining a local candidate cost function based on the view quality of the local candidate.

14. The electronic device according to claim 9, wherein the local migration trajectory cost function is related to an orientation of the UAV, a pitch angle of the camera, and a distance between the local candidates.

15. The electronic device according to claim 9, the processor is further caused to perform the steps of:

determining a flight speed of the UAV at each local candidate based on at least one of an orientation change rate and a pitch change rate of the UAV in the global migration trajectory.

16. The electronic device according to claim 9, the processor is further caused to perform the steps of:

determining a speed variation of the UAV at each local candidate according to at least one of the UAV orientation change rate and the pitch angle change rate in the global migration trajectory;

determining a speed maximum value of the migration of the UAV between the local candidates according to the speed variation of the UAV in each local candidate; and controlling the flight speed of the UAV at each local candidate to be less than the maximum speed.

17. One or more non-transitory computer-readable storage medium comprising computer-executable instructions for controlling an unmanned aerial vehicle (UAV) which, when executed by one or more processors, causing the one or more processors to provide the steps of:

drawing a drawn path on a map;

obtaining, by an electronic device, the drawn path on the map;

sampling and smoothing the drawn path to generate a first path;

determining a candidate region of interest and sample viewpoints in a three-dimensional space according to sample points of the first path;

determining a local candidate according to the candidate region of interest and the sample viewpoints, and obtaining a local candidate cost function;

generating a local migration trajectory according to a path between different local candidates, and obtaining a local migration trajectory cost function of the local migration trajectory;

constructing a set travelling salesman problem according to the local candidate cost function and the local migration trajectory cost function, and solving the set travelling salesman problem to obtain a global migration trajectory;

controlling flying of the UAV based on the global migration trajectory; and controlling a camera of the UAV to capture images or videos along the global migration trajectory, wherein the sample points of the first path refer to feature points constituting the first path; and the sample viewpoints refer to points selected in a vertical line perpendicular to a surface where the sample points of the first path are located, wherein the obtaining the drawn path on the map and sampling and smoothing the drawn path to generate the first path comprises:

calculating a curvature of each point on the drawn path, and extracting a point whose curvature is greater than a threshold as a feature point;

performing sampling processing on the feature points; and generating the first path according to the sampled feature points.

18. The computer-readable storage medium according to claim 17, wherein the processor is further caused to perform the steps of:

determining the candidate region of interest according to visual interest values of a region of interest within a preset range of the sample points of the first path;

determining a safe flight space according to the sample points of the first path; and determining sample viewpoints in the three-dimensional space according to the sample points of the first path and the safe flight space.

19. The computer-readable storage medium according to claim 18, wherein the processor is further caused to perform the steps of:

determining the visual interest values of the region of interest within the preset range of the sample points of the first path; and determining the candidate region of interest from a maximum value of the visual interest values.

20. The computer-readable storage medium according to claim 18, wherein the processor is further caused to perform the steps of:

obtaining a first altitude and a second altitude configured relative to a ground where sample points of the first path are located, an area between the first altitude and the second altitude is a safe flight space; and adding a preset height to a height on the candidate region of interest to update the first height when the first height overlaps the candidate region of interest.

* * * * *